United States Patent

[11] 3,530,778

| [72] | Inventors | James M. Conner<br>South Pasadena, California;<br>Patrick L. Finelli, Sudbury, Massachusetts |
|---|---|---|
| [21] | Appl. No. | 717,812 |
| [22] | Filed | April 1, 1968<br>Continuation-in-part of Ser. No.<br>640,858, May 24, 1967, abandoned |
| [45] | Patented | Sept. 29, 1970 |
| [73] | Assignee | Polaroid Corporation,<br>Cambridge, Mass.,<br>a corporation of Delaware |

[54] PHOTOGRAPHIC CAMERA
9 Claims, 7 Drawing Figs.

[52] U.S. Cl. .................................................... 95/13,
95/31, 292/256, 220/55
[51] Int. Cl. ..................................................... G03b 17/52
[50] Field of Search ........................................... 240/41.55;
95/13, 32, 34, 11, 31; 240/52.3; 211/83, 84;
220/55a, 55d, 55e, 55f, 55g, 55p,
55r, 55t; 292/304, 256

[56] References Cited
UNITED STATES PATENTS

| 785,239 | 3/1905 | Thornton .................... | 95/33 |
| 1,345,379 | 7/1920 | McArthur ................... | 220/55 |
| 1,424,816 | 8/1922 | Grillone ...................... | 95/13 |
| 1,860,302 | 5/1932 | Thomas ...................... | 292/256X |

Primary Examiner—Norton Ansher
Assistant Examiner—Richard L. Moses
Attorneys—Brown and Mikulka, William D. Roberson and James L. Neal ABSTRACT: A photographic camera includes a hinged two-part body which can be opened to provide access to its interior and closed to provide a light-tight enclosure during photographic exposure production. The body is releasably retained in its closed condition by a generally U-shaped structure which engirdles a first part of the camera body so as to trap a projecting portion of the second part of the body between the first part and the U-shaped structure.

Patented Sept. 29, 1970

3,530,778

INVENTORS
James M. Connor
and
Patrick L. Finelli
BY
Brown and Mikulka
and
James L. Neal
ATTORNEYS Patented Sept. 29, 1970

INVENTORS
James M. Connor
and
BY Patrick L. Finelli
Brown and Mikulka
and
James L. Neal
ATTORNEYS Patented Sept. 29, 1970

INVENTORS
James M. Connor
and
BY Patrick L. Finelli
Brown and Mikulka
and
James L. Neal
ATTORNEYS 3,530,778

PHOTOGRAPHIC CAMERA

CROSS REFERENCE TO RELATED APPLICATION

This application is a continuation-in-part of application Ser. No. 640,858, entitled Photographic Camera, filed May 24, 1967, in the name of James M. Conner and Patrick L. Finelli, now abandoned.

BRIEF SUMMARY OF THE INVENTION

This invention contemplates a photographic camera comprising two pivotally connected enclosure defining camera body members which may be opened to provide access to the interior of the camera and means for securely closing the camera. Appropriate light seal means may be provided along adjoining portions of the two parts.

A principal advantage of the apparatus of this invention resides in its economical construction, reliability and ease of operation.

In the embodiments disclosed, a U-shaped structure having a pair of side members and a connecting member is mounted on one side of the pair of camera body members adjacent and end thereof for pivotal movement about the end. The U-shaped structure is movable to a position wherein the connecting portion resiliently bears against a seating surface portion of the aforesaid one member and engages a bifurcation of the other of the aforesaid body members, which bifurcation is disposed upon opposite sides of the aforesaid seating surface of the one member. The bifurcation is pressed by spaced portions of the connecting member against a portion of the aforesaid one body member.

This construction is particularly adaptable to photographic cameras for photography according to the diffusion transfer process. Such a camera may use for example, an assembly of photographic materials including a dark slide, a photographic sheet, an image-receiving sheet and a leader for each of the photosensitive and image-receiving sheets. The assembly of photographic materials is installed within the camera such that a portion of the dark slide and the leaders for the photosensitive sheets are located in the camera in the zone between the bifurcation of the other of the aforesaid body members, the dark slide extending from the camera through a slot in the aforesaid zone. The assembly of photographic materials is so constructed that extraction of the dark slide previous to photographic exposure draws an end of the leader of a first photosensitive sheet from the aforesaid zone, through the slot, so that the leader is presented outside the camera. The camera is then operated to photographically expose the first photosensitive sheet and, subsequently, the leader therefor is entirely withdrawn from the camera through the aforementioned slot to locate the photosensitive sheet in superposition with the image-receiving sheet for subsequent withdrawal from the camera through an exit provided for that purpose. For a complete description of an assembly of photographic materials usable with the photographic camera of this invention, refer to U.S. Pat. No. 3,080,805 which issued to J. A. Hamilton on Mar. 12, 1963, and U.S. Pat. No. 3,357,330 which issued to J. B. Murphy on Dec. 12, 1967.

It is a primary object of this invention to provide a photographic camera, the body of which may be opened to provide access to its interior, having economical, uncomplicated and reliable apparatus for securely closing the camera body during photographic exposure.

A further object of this invention is to provide a photographic camera, the body of which may be opened to provide access to its interior, having economical, uncomplicated and reliable apparatus for securely closing the camera body during photographic exposure, which apparatus is characterized by simplicity of operation.

Other objects of the invention will in part be obvious and will in part appear hereinafter.

DETAILED DESCRIPTION OF THE DRAWINGS

Figure 1:
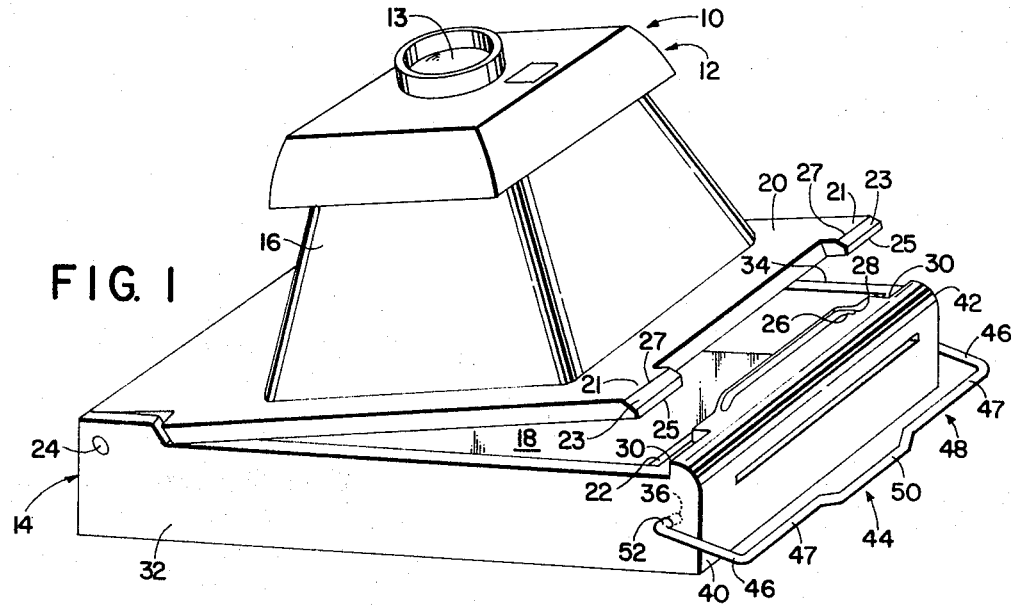
FIG. 1 is a perspective view of apparatus embodying the present invention in the open position.

Reference is now made to FIG. 1 wherein there is shown one embodiment of the camera of this invention. Camera 10 comprises a front body member 12, a back body member 14 and bellows enclosure 16.

Front member 12 includes an exposure aperture and a shutter means (not shown), a lens assembly 13 and member 20 having bifurcation 21. The shutter means establishes an exposure interval through the aperture and the lens assembly focuses light admitted through the aperture onto a focal plane located in back member 14. Back member 14 includes means for supporting at least one sheet of photosensitive material 18 in the focal plane for exposure during the exposure interval and is pivotally connected to front member 12 by hinge means 24.

Back member 14 further comprises light seal means 22, cam means 26, seating surface 28, a pair of flat surfaces 30, opposed side portions 32 and 34. Cam means 26, seat 28 and flat surfaces 30 are formed integrally with end portion 40 of member 14. The cam means extends outwardly from rounded edge 42 of the end portion, intermediate opposed portions 32 and 34. Seat 28 is located adjacent cam means 26 on the side thereof opposite the side adjacent rounded edge 42. Flat surfaces 30 are positioned at each of opposing ends of seat 28 for receiving bifurcation 21 of member 20.

Substantially U-shaped structure 44 is pivotally mounted on member 14 by opposed bearing means 36 for pivotal movement about end 40 of member 14. Structure 44 comprises sides 46, connecting portion 48, segments 47 of portion 48 for pressing bifurcation 21 against surfaces 30, grip means 50 extending from the connecting portion, and a pair of trunnions 52 extending from sides 46 into mounting engagement with bearing means 36. The dimensions of sides 46 are such that cam means 26 will intercept connecting portion 48 of member 44 as it is moved about end 40 of member 14. Portion 48 is long relative to sides 46 and is characterized by a degree of resilience sufficient to allow it to flex and be forced over cam means 26 onto seat 28.

Front member 12 includes member 20 from which bifurcation 21 extends. Each of the prongs of the bifurcation includes a sloped bearing surface 23 extending from ends 25 thereof to location 27 remote from the ends. The sloped contour of the bearing surface is such that the thickness of the projecting members progressively increases from end 25 to location 27.

Figure 2:
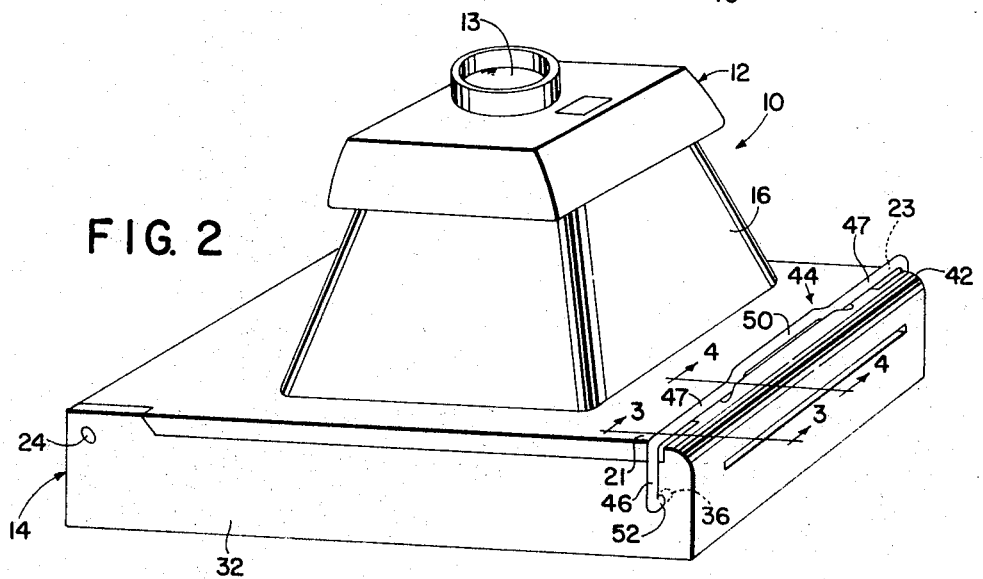
FIG. 2 is a perspective view of the apparatus of FIG. 1 in the closed position.

As shown in FIG. 1, camera 10 is open so as to provide access to the inside thereof. In Fig. 2, camera 10 is closed. In the closed condition, U-shaped structure 44 has been pivoted around end 40 over cam means 26, onto seat 28, to engage bifurcation 21 between segments 47 of connecting portion 48 of the U-shaped structure and surfaces 30 of member 14.

A description of the closing operation follows. Member 14 and member 12 are pivoted about hinge 24 to the closed position wherein the projecting members of bifurcation 21 straddle seat 28 and rest upon flat surfaces 30. U-shaped structure 44 is then pivoted about end 40 of member 14 until movement thereof is intercepted by engagement of connecting portion 48 thereof by cam means 26. Grip means 50 is then used to manually urge connecting portion 48 over cam means 26, the resilient characteristics of the connecting portion permitting sufficient flexure thereof to allow its passage over the cam. Immediately after connecting portion 48 has moved over cam means 26 it springs back toward its original shape and thereby moves into seating relationship with seating surface 28.

Figures 3, 4:
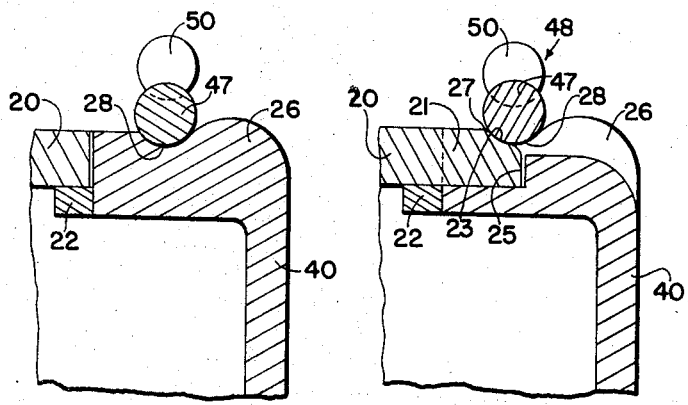
FIG. 3 is a section taken along line 3–3 of FIG. 2.
FIG. 4 is a section taken along line 4–4 of FIG. 2.

Spaced segments 47 of connecting portion 48 engage bearing surfaces 23 of bifurcation 21 to press the prongs thereof against flat surfaces 30 of member 14. The relative positions and dimensions of bifurcation 21, cam means 26, seating surface 28, and sides 46 of structure 44 exert a pull on the ends of connecting portion 48 adjoining sides 46, so that spaced segments 47 forcibly engage bearing surface 23. The sloped contours of the bearing surfaces are such that the forces applied thereto by segments 47 include components normal and tangential to flat surfaces 30 to provide exceptionally firm seating of bifurcation 21 upon flat surfaces 30. The components normal to surfaces 30 provide the holding force for maintaining the projecting members of the bifurcation in contact with surfaces 30 while the components tangential to surfaces 30 prevent virtually all relative movement of bifurcation 21 and surfaces 30 tangentially of surfaces 30. This feature is best understood by reference to FIGS. 3 and 4.

To open camera 10, grip 50 is manually engaged to pull structure 44 from seating surface 28 and over cam means 26 to release bifurcation 21 and thereby release member 12. When the camera is open, structure 44 serves as a handle by which the camera may be held while placing photosensitive material into the camera or performing other operations therein.

Figure 5:
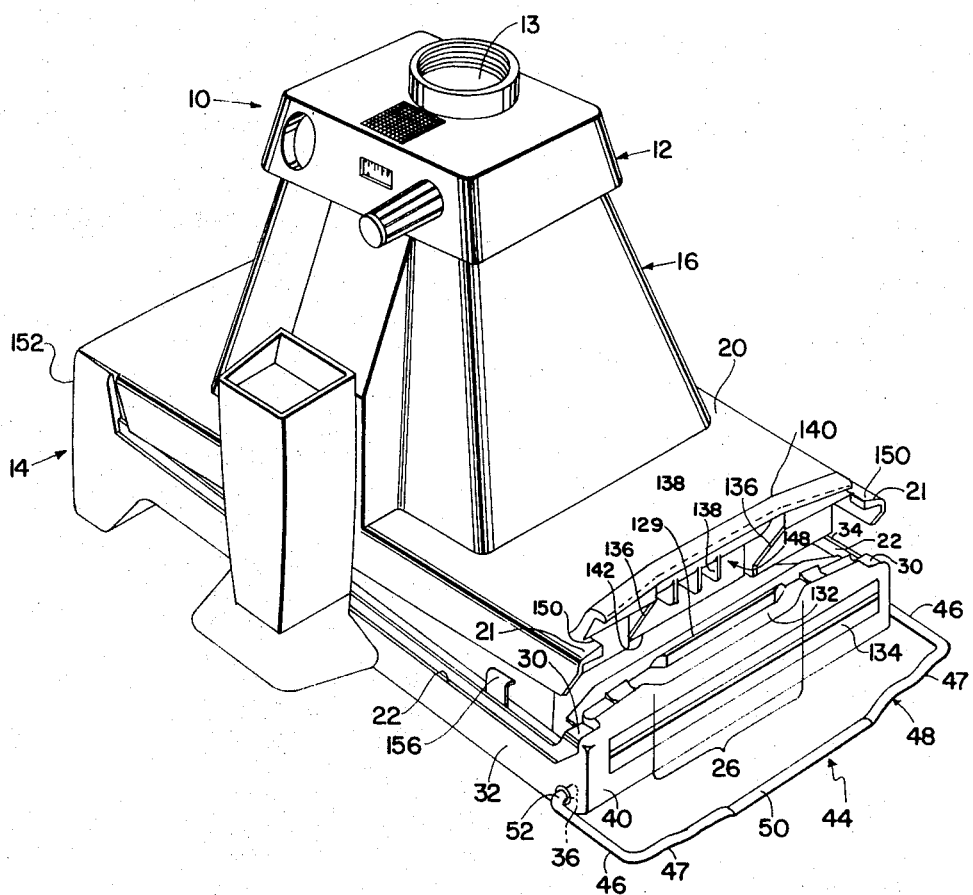
FIG. 5 is a perspective view of another embodiment of the apparatus of the present invention shown in the open position.
Figure 6:
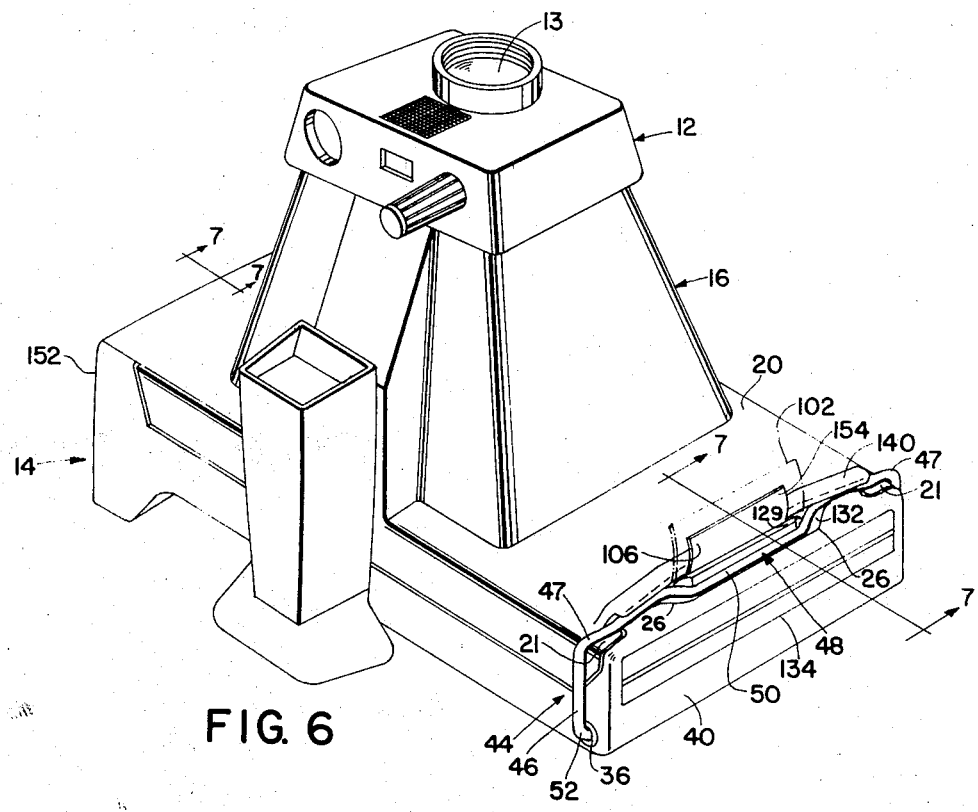
FIG. 6 is a perspective view of the apparatus of FIG. 1 in the closed position.
Figure 7:
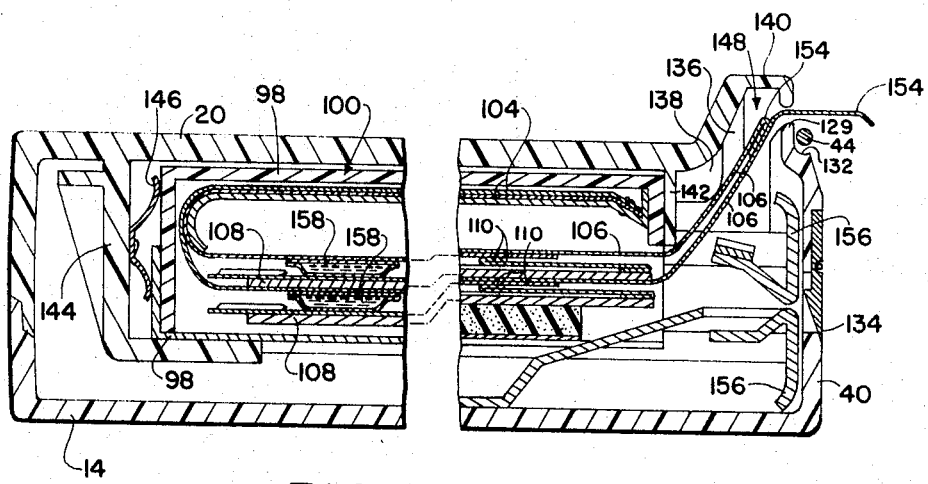
FIG. 7 is a section taken along line 7–7 of FIG. 6.

Reference will now be made to FIGS. 5, 6 and 7 wherein another embodiment of the invention is shown. Parts substantially like these shown in FIGS. 1—4 are designated by like numerals.

This embodiment is adapted for photography according to the diffusion transfer process and is usable with assembly 100 of photographic materials. The assembly includes housing 98, dark slide 102, a plurality of photosensitive sheets, 104, a leader 106 for each photosensitive sheet and a plurality of image-receiving sheet means, each including an image-receiving sheet 108 and a leader 110. During camera operation, one photosensitive sheet 104 is exposed; leader 106 is then manually pulled to draw the exposed sheet 104 into superposition with an image-receiving sheet 108 and to present leader 110. Leader 110 is manually pulled to draw sheets 104 and 108 from the camera in superposition. The construction and operation of the type herein involved are fully disclosed in the aforementioned U.S. Pat. Nos. 3,080,805 and 3,357,330.

Back member 14 comprises light seal means 22, cam means 26, contour 132 adjacent cam means 26, lip 129, slot 130 formed by lip 129 and configurations of member 20 to hereafter be described, a pair of flat surfaces 30, opposed side portions 32 and 34, and a pair of opposed bearing means 36 located near end 40 in opposed side portions 32 and 34. Cam means 26, contour 132 and flat surfaces 30 are formed integrally with end portion 40 of member 14. Contour 132 is located adjacent cam means 26 on the side thereof opposite the outer surface of end 40. Lip 129 is positioned adjacent contour 132 on the side thereof opposite cam means 26 to act as a stop for structure 44 as well as to facilitate the formation of slot 130. Flat surfaces 30 are positioned at each of opposite ends of contour 132 for receiving bifurcation 21 of member 20. End 40 of back member 14 also includes exit means 134 to permit the photographic materials to be drawn from the camera by the extraction of leader 110, as will hereafter be described.

Substantially U-shaped structure 44 is pivotally mounted upon member 19 by opposed member 26 for pivotal movement. Structure 44 comprises sides 46, connecting portion 48, segments 47 of portion 48 for pressing bifurcation 21 against surfaces 30, grip means 50 formed by connecting portion 48, and a pair of trunnions 52 extending from sides 46 into mounting engagement with bearing means 26. Grip means 50 turns away from slot 130 to permit leaders 106 to be freely advanced from the camera. The dimensions of sides 46 are such that cam means 26 will intercept connecting portion 48 of member 44 as it is moved about end 40 of member 14. Portion 48 is long relative to sides 46 and is characterized by a degree of resilience sufficient to allow it to flex and forced over the cam means wherein it is loosely received by contour 132 and presses bifurcation 21 against surfaces 30.

Member 20 forms bifurcation 21 and also includes fins 136, fins 138 and hood 140. Fins 138, hood 140 and lip 129 form a chamber 148, which extends from within the camera body and is located between the prongs of bifurcation 21. Fins 138 form the sides; lip 129 forms a lower portion and hood 140 covers the upper portion of the chamber and cooperates with lip 129 to form slot 130 when the camera body is closed. Member 120 further includes means for supporting assembly 100 which includes partition 142, partition 144 and spring means 146.

Assembly 100 is located between partitions 142 and 144. Spring 146 applies a biasing force to the assembly so that it is held securely in place. In this position, one photosensitive sheet 104 is positioned at the focal plane facing lens assembly 13 so that the film may be exposed upon exposure producing operation of the camera. Leaders 106 for the photosensitive sheets extend from housing 98 so that they are grouped together and positioned in chamber 148. Fins 138 within chamber 148 serve to position leaders 106 so that they are properly located for presentation, one at a time in succession, through slot 130 for subsequent manual engagement. Hood 140 also serves to prevent simultaneous engagement of more than one leader 106.

Bifurcation 21 is located for disposition on surfaces 30 when the camera body is closed. The uppermost portion 150 of the bifurcation is then located above the lower surface of contour 132 so that portion 150, solely, is positioned for pressure-applying engagement by structure 44 when the camera body is closed and structure 44 is moved over cam means 26. Portions 150 may be shaped so that they lie substantially parallel to surface 130, in which case all of the force applied by structure 44 to the portions 150 for holding members 14 and 20 in closed position is applied normal to the flat surfaces 30.

Operation is as follows. An assembly 100 of photographic material is installed, as described above, and members 14 and 20 pivoted about a hinge, not shown, adjacent end 152 of the camera body to the closed position wherein the projecting members of bifurcation 21 straddle chamber 148 and cam means 26 and rests upon surfaces 30. U-shaped structure 44 is then pivoted about end 40 of member 14 until movement thereof is intercepted by engagement of connecting portion 48 thereof with cam means 26. Grip means 50 is then used to manually urge connecting portion 48 over cam means 26, the resilient characteristics of the connecting portion permitted sufficient flexure thereof to allow its passage over the cam. Immediately after connecting portion 48 is moved over cam means 26, it springs back toward its original unflexed shape and segment 47 thereof moves into pressure-applying relationship with portion 150 of bifurcation 21. Contour 132 loosely receives portion 148 and thereby permits portion 48 to move toward its unflexed shape until it engages bifurcation 21. Lip 129 prevents overtravel of structure 44.

The lengths of side portions 46 are such that, when structure 44 has been moved into the position wherein segments 47 thereof engage bifurcation 21, a pull is exerted on the ends of connecting portion 48 to effect the forcible engagement of portions 150 by segments 47.

Dark slide 102, partially shown in phantom lines in FIG. 6, protects the photosensitive sheets from premature exposure while assembly 100 is being operatively installed in the camera. After installation of the assembly and before photographic exposure production, the dark slide is withdrawn between structure 100 and member 20. Withdrawal of the dark slide causes end 154 of one leader 106 to be presented through slot 130 for subsequent manual engagement. (It should be noted that the dark slide and a leader 106 at no time extend simultaneously from the camera body.) A photographic exposure is produced. The leader 106 previously presented is then manually withdrawn from the camera. Withdrawal of the leader 106 presents another leader 106 through slot 130 and advances the exposed photosensitive sheet 104 into superposition with an image-receiving sheet 108. Withdrawal of leader also advances the leader 110 for the image-receiving sheet in superposition with exposed film 104 between pressure-applying members 156 and out through exit means 134. Leader 110 is pulled to draw the superposed photographic materials between pressure-applying members 156 to spread a fluid processing material between them and out exit means 134. The fluid processing material is typically contained in a pod 158, attached adjacent the leading edge of the photosensitive sheet. The pod is ruptured upon initial movement of the sheets between the pressure-applying members and continuous movement of the sheets therethrough spreads the liquid between the sheets.

Since certain changes may be made in the above apparatus without departing from the scope of the invention herein involved, it is intended that all matter contained in the above description or shown in the accompanying drawings shall be interpreted as illustrative and not in a limiting sense.

We claim:

1. A photographic camera having a pair of cooperating enclosure-defining members pivotally connected to each other for opening and closing movement comprising:
   a. structure having an elongated connecting portion and a pair of substantially parallel side portions extending unidirectionally from opposite ends of said connection portion, the ends of said side portions remote from said connecting portion being pivotally mounted to opposed portions of one of said enclosure-defining members;
   b. a seating surface for said connecting portion of said structure, said seating surface being disposed on said one member intermediate said opposed portions thereof;
   c. a raised cam surface on said one member arranged to intercept said connecting portion upon movement thereof onto and off of said seating surface, said connecting portion of said structure being movable from a position away from said seating surface into interception with and over said cam surface, onto said seating surface; and
   d. projecting means extending from the other of said members to overlie said one member intermediate said seating surface and at least one of said opposed portions of said one member when said members are closed, said connecting portion engaging said projecting means between said connecting portion and said one member when said connecting member is moved onto said seating surface and said members are closed to securely hold said members against opening movement.

2. A photographic camera according to claim 1 wherein said projecting means comprises a bifurcation of said other enclosure-defining member adapted to overlie said one member, astraddle said seating surface, so that each prong of said bifurcation lies intermediate said seating surface and one of said opposed portions of said one member.

3. A photographic camera according to claim 2 wherein said bifurcation further comprises bearing surface means for engagement by said connecting portion of said structure, said bearing surface means being characterized by a sloping contour extending between a location adjacent the ends of said prongs of said bifurcation and a location removed from the ends of said prongs, said sloping contour progressing from a low position relative to said seating surface of said one member when said members are closed to a high position relative to said seating surface when said members are closed.

4. A photographic camera according to claim 3 wherein said sloping contour extends from a low position adjacent the ends of said prongs to a high position removed from the ends of said prongs.

5. A photographic camera for photography according to the diffusion transfer process, said camera utilizing an assembly of photographic materials including a housing, a plurality of photosensitive sheets, a leader for each of said sheets wherein end portions of the leaders extending from said housing, and a plurality of image-receiving sheet means, said camera comprising:
   a. a first enclosure-defining member;
   b. a second enclosure-defining member pivotally connected to said first member for opening and closing movement relative thereto;
   c. means forming a bifurcation on said second enclosure-defining member, said bifurcation overlying portions of said first enclosure-defining member when said members are closed;
   d. means on said first and second enclosure-defining members forming a chamber between the prongs of said bifurcation when said first and second members are closed for enclosing said end portions of said leaders;
   e. means forming a slot in said chamber from which said end portions of said leaders may be sequentially withdrawn, withdrawal of one of said leaders being effective to position one of said photosensitive sheets in superposition with one of said image-receiving sheet means for subsequent and simultaneous withdrawal from said camera;
   f. structure having a resilient, elongated connecting portion and a pair of substantially parallel side portions extending unidirectionally from opposite ends of said connecting portion, the ends of said side portions remote from said connecting member being pivotally mounted to opposed portions of said first enclosure-defining member adjacent one end thereof, said structure being pivotable from a position wherein said connecting portion is remote from said bifurcation when said first and second members are closed to a position wherein said connecting portion engages said bifurcation to press said bifurcation against said portions of said first member when said first and second members are closed;
   g. cam means on said first enclosure-defining member in the path of movement of said structure as said structure is pivoted from said position wherein said connecting portion is remote from said bifurcation to said position wherein said connecting portion engages said bifurcation, for deflecting said connecting portion just prior to movement thereof into engagement with said bifurcation, said cam means being located closely adjacent said slot; and
   h. means, intermediate said slot and said cam means, forming a contour which loosely receives said connecting portion of said structure after said structure is moved over said cam means for relieving the deflection of said connecting member to permit it to firmly engage said bifurcation.

6. A photographic camera comprising:
   a. a pair of enclosure-defining members connected for opening and closing movement relative to each other, said members being configured to define an elongated opening therebetween for access to the interior of said camera when disposed in their enclosure-defining positions;
   b. structure having an elongated connecting portion and a pair of side portions extending unidirectionally from opposite ends of said connection portion, the ends of said side portions remote from said connecting portion being pivotally mounted to opposed portions of one of said enclosure-defining members, said structure being pivotally movable between a holding position for maintaining said members in closed relationship and a release position for permitting said members to move relative to each other without passing over said elongated opening;
   c. means projecting from the other of said members to overlie said one member intermediate said opposed portions of said one member when said members are closed; and
   d. a raised cam surface on said one member intermediate said opposed portions thereof arranged to intercept said connecting portion of said structure when said structure is moved toward said holding position, said connecting portion being movable over said cam surface to its holding position where said connecting portion is firmly restrained against movement from its holding position by said cam surface and securely retains said projecting means against said one member.

7. Photographic apparatus according to claim 6 wherein said connecting portion of said structure is resilient to permit the flexure thereof and thereby facilitate movement of said connecting portion over said cam means.

8. Photographic apparatus according to claim 6 further comprising a seating surface on said one member for receiving said connecting portion of said structure when said connecting portion is moved over said cam surface to its holding position.

9. Photographic apparatus according to claim 8 wherein said connecting portion is resilient to permit flexure thereof during its movement over said cam surface and to effect return thereof to its original shape after its passage over said cam surface.